US009853683B2

United States Patent
Khlat et al.

(10) Patent No.: US 9,853,683 B2
(45) Date of Patent: Dec. 26, 2017

(54) RADIO FREQUENCY FRONT END CIRCUITRY FOR UPLINK CARRIER AGGREGATION

(71) Applicant: Qorvo US, Inc., Greensboro, NC (US)

(72) Inventors: Nadim Khlat, Cugnaux (FR); Marcus Granger-Jones, Scotts Valley, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/289,476

(22) Filed: Oct. 10, 2016

(65) Prior Publication Data

US 2017/0104509 A1   Apr. 13, 2017

(51) Int. Cl.
*H04B 1/44* (2006.01)
*H04L 5/00* (2006.01)
*H04B 1/00* (2006.01)
*H04L 5/14* (2006.01)

(52) U.S. Cl.
CPC .............. *H04B 1/44* (2013.01); *H04B 1/0057* (2013.01); *H04L 5/001* (2013.01); *H04L 5/1461* (2013.01)

(58) Field of Classification Search
CPC .......... H04B 1/0057; H04B 1/44; H04L 5/001
See application file for complete search history.

(56) References Cited

U.S. PATENT DOCUMENTS

| 2009/0117938 A1* | 5/2009 | Georgantas | ..........  H04B 1/0028 455/552.1 |
| 2013/0231064 A1* | 9/2013 | Gudem | ................ H04B 1/0057 455/73 |

\* cited by examiner

*Primary Examiner* — Xin Jia
(74) *Attorney, Agent, or Firm* — Withrow & Terranova, P.L.L.C.

(57) ABSTRACT

Radio frequency (RF) front end circuitry includes primary communications circuitry and secondary communications circuitry. The primary communications circuitry is configured to provide primary RF transmit signals and receive primary RF receive signals. The secondary communications circuitry is configured to provide primary RF transmit signals during certain uplink carrier aggregation configurations to provide antenna-to-antenna isolation between primary RF transmit signals and thus reduce intermodulation between signals in problematic operating band combinations.

20 Claims, 6 Drawing Sheets

RADIO FREQUENCY FRONT END CIRCUITRY FOR UPLINK CARRIER AGGREGATION

RELATED APPLICATIONS

This application claims the benefit of provisional patent application Ser. No. 62/239,327, filed Oct. 9, 2015, the disclosure of which is hereby incorporated herein by reference in its entirety.

FIELD OF THE DISCLOSURE

The present disclosure relates to radio frequency (RF) front end circuitry, and in particular to RF front end circuitry suitable for uplink carrier aggregation.

BACKGROUND

Figure 1:
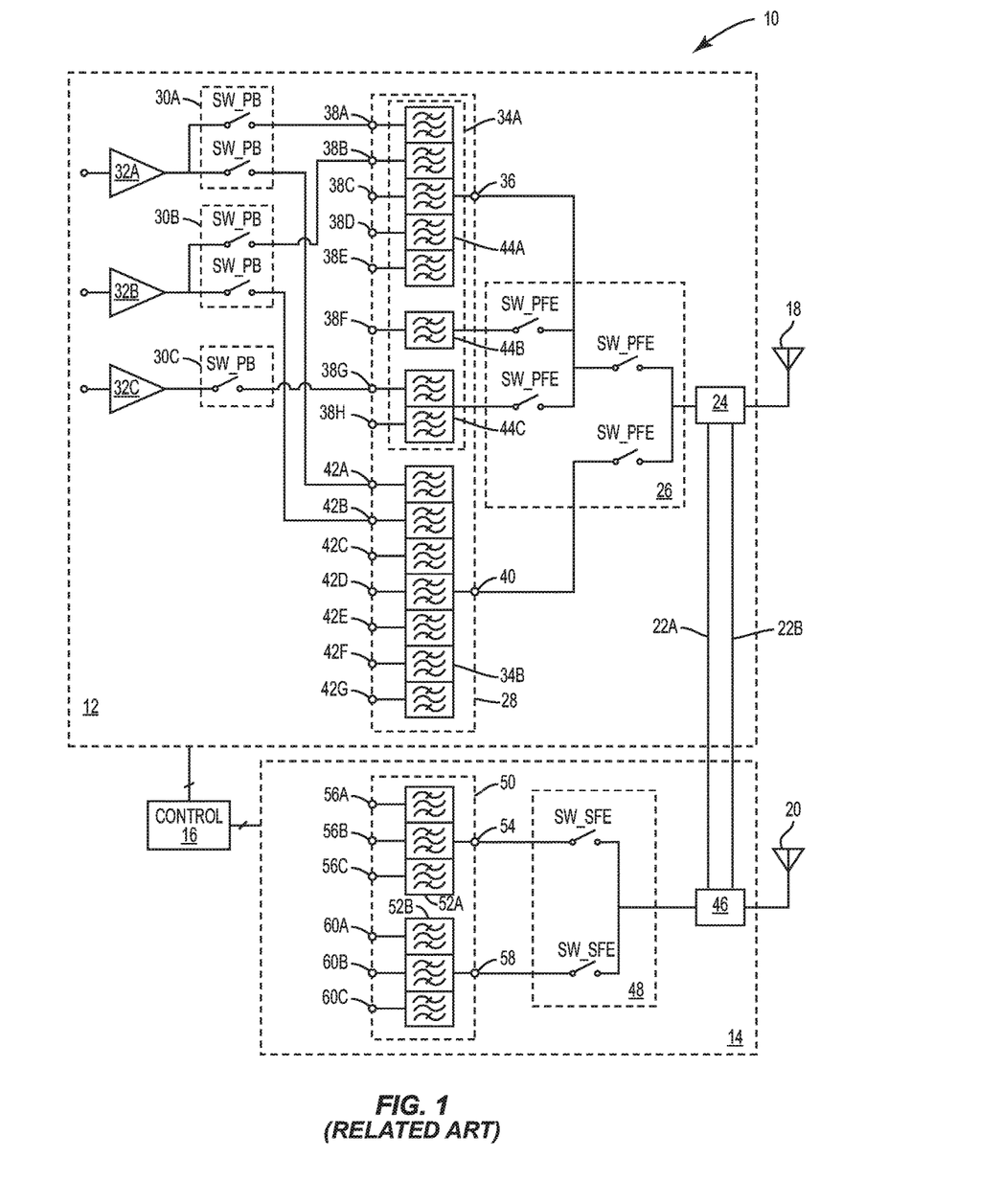
FIG. 1 is a functional schematic of conventional radio frequency (RF) front end circuitry.

Carrier aggregation, in which a wireless communications device simultaneously transmits and/or receives radio frequency (RF) signals over multiple RF frequency bands, has become increasingly popular in order to maximize data throughput. Supporting carrier aggregation in a wireless communications device presents several challenges in the design and manufacture of the device. FIG. 1 is a functional schematic of conventional radio frequency (RF) front end circuitry 10 suitable for performing both uplink carrier aggregation in which multiple RF transmit signals in different operating bands are simultaneously transmitted and downlink carrier aggregation in which multiple RF receive signals in different operating bands are simultaneously received. The conventional RF front end circuitry 10 includes primary communications circuitry 12, secondary communications circuitry 14, and control circuitry 16. The primary communications circuitry 12 is coupled to a primary antenna 18. The secondary communications circuitry 14 is coupled to a secondary antenna 20. The primary communications circuitry 12 and the secondary communications circuitry 14 are coupled to one another via a first antenna swapping line 22A and a second antenna swapping line 22B. The control circuitry 16 is coupled to both the primary communications circuitry 12 and the secondary communications circuitry 14.

The primary communications circuitry 12 includes antenna swapping circuitry 24 coupled between the primary antenna 18 and primary front end switching circuitry 26, primary RF filtering circuitry 28 coupled between the primary front end switching circuitry 26 and a number of band switches 30, and a number of primary RF power amplifiers 32 coupled to the band switches 30. The primary front end switching circuitry 26 includes a number of primary front end switching elements SW_PFE configured to selectively couple one or more filtering elements in the primary RF filtering circuitry 28 to the antenna swapping circuitry 24. The primary RF filtering circuitry 28 includes a reconfigurable multiplexer 34A and a heptaplexer 34B. The reconfigurable multiplexer 34A is coupled between a first common node 36 and a first set of input/output nodes 38. The heptaplexer 34B is coupled between a second common node 40 and a second set of input/output nodes 42.

The reconfigurable multiplexer 34A includes a pentaplexer 44A, a receive filter 44B, and a duplexer 44C. The pentaplexer 44A is configured to pass primary RF transmit signals within a first operating band, a second operating band, and a third operating band between a first one of the first set of input/output nodes 38A and the first common node 36 while attenuating other signals in this path, pass primary RF transmit signals within a fourth operating band between a second one of the first set of input/output nodes 38B and the first common node 36 while attenuating other signals in this path, pass primary RF receive signals within the first operating band between the first common node 36 and a third one of the first set of input/output nodes 38C while attenuating other signals in this path, pass primary RF receive signals within the second operating band, the third operating band, and the fourth operating band between the first common node 36 and a fourth one of the first set of input/output nodes 38D while attenuating other signals in this path, and pass primary RF receive signals within a fifth operating band between the first common node 36 and a fifth one of the first set of input/output nodes 38F while attenuating other signals in this path.

The receive filter 44B is configured to pass primary RF receive signals within a sixth operating band between the first common node 36 and a sixth one of the first set of input/output nodes 38F while attenuating other signals in this path.

The duplexer 44C is configured to pass primary RF transmit signals within a seventh operating band between a seventh one of the first set of input/output nodes 38G and the first common node 36 while attenuating other signals in this path and pass primary RF receive signals within the seventh operating band between the first common node 36 and an eighth one of the first set of input/output nodes 38H while attenuating other signals in this path.

The heptaplexer 34B is configured to pass primary RF transmit signals within the second operating band between a first one of the second set of input/output nodes 42A and the second common node 40 while attenuating other signals in this path, pass primary RF transmit signals within an eighth operating band between a second one of the second set of input/output nodes 42B and the second common node 40 while attenuating other signals in this path, pass primary RF transmit signals within a ninth operating band between a third one of the second set of input/output nodes 42C and the second common node 40 while attenuating other signals in this path, pass primary RF receive signals within the eighth operating band between the second common node 40 and a fourth one of the second set of input/output nodes 42D while attenuating other signals in this path, pass primary RF receive signals within the second operating band between the second common node 40 and a fifth one of the second set of input/output nodes 42E while attenuating other signals in this path, pass primary RF receive signals within the ninth operating band between the second common node 40 and a sixth one of the second set of input/output nodes 42F while attenuating other signals in this path, and pass primary RF receive signals within a tenth operating band between the second common node 40 and a seventh one of the second set of input/output nodes 42G while attenuating other signals in this path.

The primary front end switching circuitry 26 may selectively couple the receive filter 44B to the pentaplexer 44A when the conventional RF front end circuitry 10 is receiving in the sixth operating band, connect the duplexer 44C to the pentaplexer 44A when the conventional RF front end circuitry 10 is transmitting and/or receiving in the seventh operating band, or isolate the receive filter 44B and the duplexer 44C from the pentaplexer 44A when the conventional RF front end circuitry 10 is not transmitting or receiving in the sixth operating band or the seventh operating band. Those skilled in the art will appreciate that providing the reconfigurable multiplexer 34A in this manner may allow the primary RF filtering circuitry 28 to support a desired number of operating bands while reducing loading in the RF signal path of the primary communications circuitry 12. The primary front end switching circuitry 26 may connect the antenna swapping circuitry 24 to one of the reconfigurable multiplexer 34A (the configuration of which is set by the primary front end switching circuitry 26 as discussed above) or the heptaplexer 34B, depending on the operating bands in which the conventional RF front end circuitry 10 is transmitting and/or receiving.

The first primary RF power amplifier 32A may be configured to amplify RF transmit signals within the first operating band, the second operating band, and the third operating band. Depending on the operating band or operating bands in which the first primary RF power amplifier 32A is transmitting and the operating band or operating bands in which the conventional RF front end circuitry 10 is receiving, a number of primary band switches SW_PB in a first band switch 30A may couple the first primary RF power amplifier 32A to one of the reconfigurable multiplexer 34A or the heptaplexer 34B.

The second primary RF power amplifier 32B may be configured to amplify RF transmit signals within the fourth operating band and the eighth operating band. Depending on the operating band or operating bands in which the second primary RF power amplifier 32B is transmitting and the operating band or operating bands in which the conventional RF front end circuitry 10 is receiving, a number of primary band switches SW_PB in a second band switch 30B may couple the second primary RF power amplifier 32B to one of the reconfigurable multiplexer 34A or the heptaplexer 34B.

The third primary RF power amplifier 32C may be configured to amplify RF transmit signals within the seventh operating band. Depending on the operating band or operating bands in which the third primary RF power amplifier 32C is transmitting and the operating band or operating bands in which the conventional RF front end circuitry 10 is receiving, a number of primary band switches SW_PB in a third band switch 30C may selectively couple the third primary RF power amplifier 32C to the reconfigurable multiplexer 34A. Since the third primary RF power amplifier 32C does not provide RF transmit signals in an operating band supported by the heptaplexer 34B, the third band switch 30C does not connect thereto. While not shown, additional switches in the first band switch 30A, the second band switch 30B, and the third band switch 30C may couple the respective primary RF power amplifiers 32 to additional filters in the primary RF filtering circuitry 28.

While not shown, a number of low-noise amplifiers (LNAs) may connect to the remaining input/output nodes in the first set of input/output nodes 38 and the second set of input/output nodes 44 in order to amplify receive signals therefrom for further processing.

The secondary communications circuitry 14 includes antenna swapping circuitry 46 coupled between the secondary antenna 20 and secondary front end switching circuitry 48 and secondary RF filtering circuitry 50 coupled to the secondary front end switching circuitry 48. The secondary front end switching circuitry 48 includes a number of secondary front end switching elements SW_SFE configured to selectively couple one or more filters in the secondary RF filtering circuitry 50 to the antenna swapping circuitry 46. The secondary RF filtering circuitry 50 includes a first triplexer 52A and a second triplexer 52B. The first triplexer 52A is coupled between a first common node 54 and a first set of input/output nodes 56. The second triplexer 52B is coupled between a second common node 58 and a second set of input/output nodes 60.

The first triplexer 52A is configured to pass secondary RF receive signals within the second operating band, the third operating band, and the fourth operating band between the first common node 54 and a first one of the first set of input/output nodes 56A while attenuating other signals in this path, pass secondary RF receive signals within the eighth operating band between the first common node 54 and a second one of the first set of input/output nodes 56B while attenuating other signals in this path, and pass secondary RF receive signals within the ninth operating band between the first common node 54 and a third one of the first set of input/output nodes 56C while attenuating other signals in this path.

The second triplexer 52B is configured to pass secondary RF receive signals within the first operating band between the second common node 58 and a first one of the second set of input/output nodes 60A while attenuating other signals in this path, pass secondary RF receive signals within the second operating band and the fourth operating band between the second common node 58 and a second one of the second set of input/output nodes 60B while attenuating other signals in this path, and pass secondary RF receive signals within the seventh operating band between the second common node 58 and a third one of the second set of input/output nodes 60C while attenuating other signals in this path.

While not shown, a number of LNAs may connect to the first set of input/output nodes 56 and the second set of input/output nodes 60 in order to amplify receive signals therefrom for further processing.

The antenna swapping circuitry 24 in the primary communications circuitry 12 and the antenna swapping circuitry 46 in the secondary communications circuitry 14 are coupled via the first antenna swapping line 22A and the second antenna swapping line 22B. The antenna swapping circuitry 24 in the primary communications circuitry 12 may cooperate with the antenna swapping circuitry 46 in the secondary communications circuitry 14 to selectively couple one of the primary antenna 18 and the secondary antenna 20 to the primary front end switching circuitry 26 and couple the antenna not coupled to the primary front end switching circuitry 26 to the secondary front end switching circuitry 48.

Those skilled in the art will appreciate that the primary communications circuitry 12 is responsible for transmitting and receiving primary RF transmit signals and primary RF receive signals within one or more operating bands, while the secondary communications circuitry 14 is configured to receive secondary RF receive signals within the one or more operating bands. As discussed herein, primary RF transmit signals and primary RF receive signals are the main transmit and receive signals used for communication, while the secondary RF receive signals are additional signals used to improve reception quality or data throughput. For example, the secondary RF receive signals may be diversity receive signals or multiple-input-multiple-output (MIMO) receive signals.

The first operating band may be Long Term Evolution (LTE) operating band 3 with a transmit frequency of 1710-1785 MHz and a receive frequency of 1805-1880 MHz, the second operating band may be LTE operating band 4 with a transmit frequency of 1710-1755 MHz and a receive frequency of 2110-2155 MHz, the third operating band may be LTE operating band 66 with a transmit frequency of 1710-1780 MHz and a receive frequency of 2110-2200 MHz, the fourth operating band may be LTE operating band 1 with a transmit frequency of 1920-1980 MHz and a receive frequency of 2110-2170 MHz, the fifth operating band may be LTE operating band 40 (TDD) with a receive frequency of 2300-2400 MHz, the sixth operating band may be LTE operating band 41 (TDD) with a receive frequency of 2496-2690 MHz, the seventh operating band may be LTE operating band 7 with a transmit frequency of 2500-2570 MHz and a receive frequency of 2620-2690 MHz, the eighth operating band may be LTE band 25 (which may include LTE band 2) with a transmit frequency of 1850-1915 MHz and a receive frequency of 1930-1995 MHz, the ninth operating band may be LTE operating band 30 with a transmit frequency of 2305-2315 MHz and a receive frequency of 2350-2360 MHz, and the tenth operating band may be LTE operating band 38 (TDD) with a receive frequency of 2570-2620 MHz.

While the conventional RF front end circuitry 10 is capable of both uplink and downlink carrier aggregation, the circuitry may suffer from signal degradation due to intermodulation distortion in certain carrier aggregation configurations. For example, when primary RF transmit signals in the first operating band and the fourth operating band are simultaneously provided from the first primary RF power amplifier 32A and the second primary RF power amplifier 32B, respectively, these signals may intermodulate with one another to produce troublesome intermodulation distortion. As discussed above, the first operating band may be LTE operating band 3, and the fourth operating band may be LTE operating band 1. This combination of LTE operating band 3 and LTE operating band 1 may be problematic, as intermodulation distortion products from the transmit signals of these bands may fall directly into the receive frequency of LTE operating band 1. To avoid desensitization of receiver circuitry configured to process primary RF receive signals in the fourth operating band, the selectivity of the filters in the pentaplexer 44A must be very high, often at levels that are unachievable within common design constraints such as cost and size.

The intermodulation products from simultaneously providing primary RF transmit signals in the first operating band and the fourth operating band may come from a variety of sources. First, the pentaplexer 44A may leak a small amount of the primary RF transmit signals in the fourth operating band backwards from the output of the second primary RF power amplifier 32B to the output of the first primary RF power amplifier 32A. These leakage signals will intermodulate with the primary RF transmit signals in the first operating band in the first band switch 30A. The same process will also occur from the first primary RF power amplifier 32A to the second primary RF power amplifier 32B in the second band switch 30B. Additionally, signals from the first primary power amplifier 32A will also leak to the second primary power amplifier 32B, where they may be amplified by the second primary power amplifier 32B to produce significant intermodulation distortion products. Second, the combination of the primary RF transmit signals within the first operating band and the fourth operating band will intermodulate in the primary front end switching circuitry 26 and the antenna swapping circuitry 24. The intermodulation distortion produced therefrom will flow back through the pentaplexer and to receive circuitry attached thereto absent a very high selectivity filter. As discussed above, such a filter may not be achievable within common design constraints, and thus the intermodulation will cause desensitization of downstream receive circuitry.

For the reasons described above, there is a need for improved RF front end circuitry capable of operating in carrier aggregation modes without excessive intermodulation.

SUMMARY

The present disclosure relates to radio frequency (RF) front end circuitry, and in particular to RF front end circuitry suitable for uplink carrier aggregation. In one embodiment, RF front end circuitry includes primary communications circuitry coupled to a primary antenna node and secondary communications circuitry coupled to a secondary antenna node. The primary communications circuitry is configured to provide primary RF transmit signals within a second operating band to a primary antenna node and receive and process primary RF receive signals within the first operating band and primary RF receive signals within the second operating band from the primary antenna node. The secondary communications circuitry is configured to provide primary RF transmit signals within the first operating band to the secondary antenna node and receive and process secondary RF receive signals within the first operating band and secondary RF receive signals within the second operating band from the secondary antenna node. Control circuitry is coupled to the primary communications circuitry and the secondary communications circuitry and configure to cause the RF front end circuitry to simultaneously provide the primary RF transmit signals within the first operating band from the secondary communications circuitry and provide the primary RF transmit signals within the second operating band from the primary communications circuitry in an uplink carrier aggregation mode of operation. By providing the primary RF transmit signals within the first operating band from the secondary communications circuitry, antenna-to-antenna isolation can be achieved between the primary RF transmit signals in the first operating band and the second operating band, thereby reducing intermodulation and improving the performance of the RF front end circuitry. Such performance improvements can be achieved with a minimal increase in area and power consumption by reusing the secondary communications circuitry to provide the primary RF transmit signals in the first operating band.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
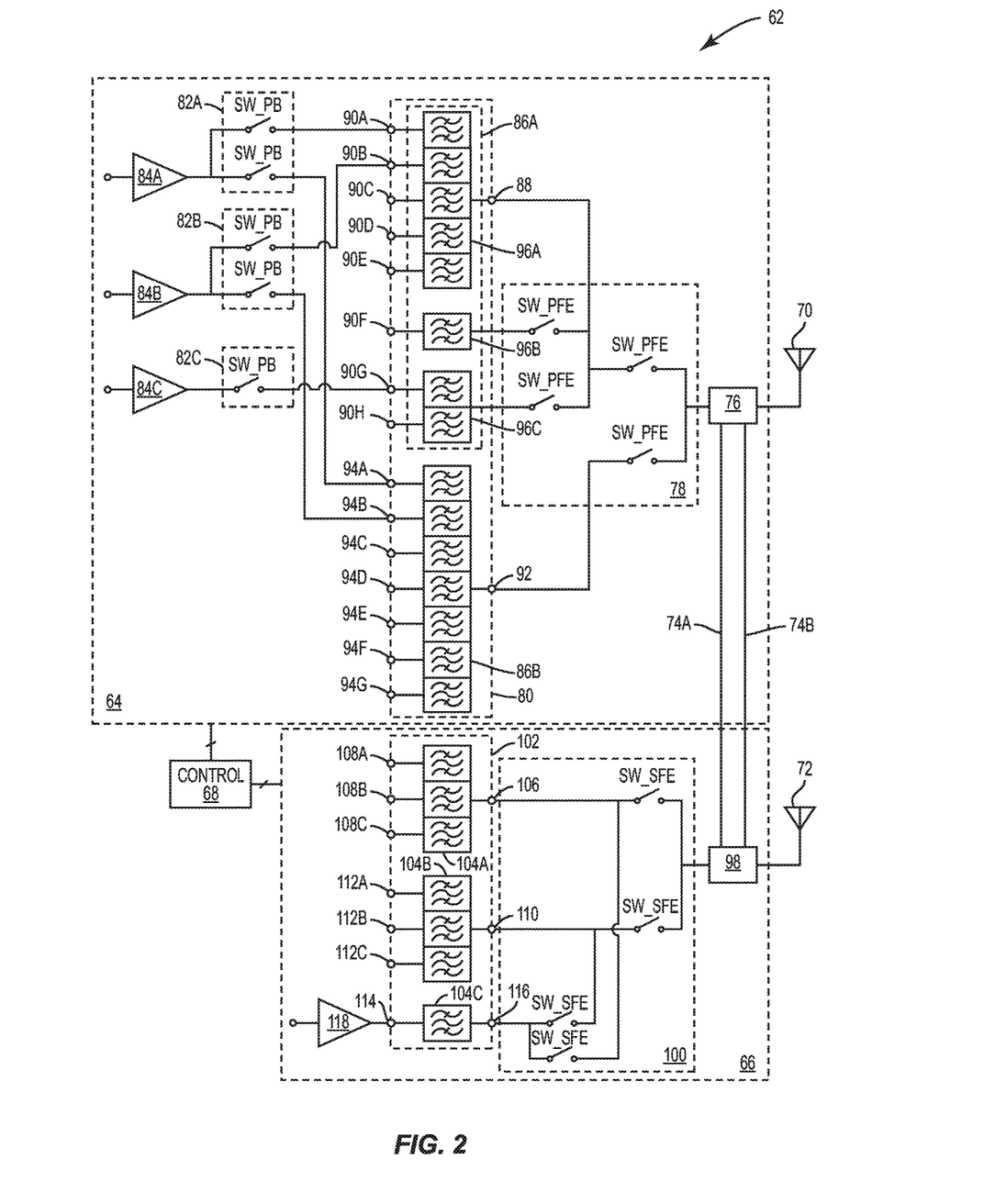
FIG. 2 is a functional schematic of RF front end circuitry according to one embodiment of the present disclosure.

FIG. 2 is a functional schematic of radio frequency (RF) front end circuitry 62 according to one embodiment of the present disclosure. The RF front end circuitry 62 includes primary communications circuitry 64, secondary communications circuitry 66, and control circuitry 68. The primary communications circuitry 64 is coupled to a primary antenna 70. The secondary communications circuitry 66 is coupled to a secondary antenna 72. The primary communications circuitry 64 and the secondary communications circuitry 66 are coupled to one another via a first antenna swapping line 74A and a second antenna swapping line 74B. The control circuitry 68 is coupled to both the primary communications circuitry 64 and the secondary communications circuitry 66.

The primary communications circuitry 64 includes antenna swapping circuitry 76 coupled between the primary antenna 70 and primary front end switching circuitry 78, primary RF filtering circuitry 80 coupled between the primary front end switching circuitry 78 and a number of band switches 82, and a number of primary RF power amplifiers 84 coupled to the band switches 82. The primary front end switching circuitry 78 includes a number of primary front end switching elements SW_PFE configured to selectively couple one or more filtering elements in the primary RF filtering circuitry 80 to the antenna swapping circuitry 76. The primary RF filtering circuitry 80 includes a first filter 86A, which is a reconfigurable filter, and a second filter 86B. The first filter 86A is coupled between a first common node 88 and a first set of input/output nodes 90. The second filter 86B is coupled between a second common node 92 and a second set of input/output nodes 94.

As discussed above, the first filter 86A is reconfigurable, and thus includes a first sub-filter 96A, a second sub-filter 96B, and a third sub-filter 96C. The first sub-filter 96A is a pentaplexer configured to pass primary RF transmit signals within a first operating band, a second operating band, and a third operating band between a first one of the first set of input/output nodes 90A and the first common node 88 while attenuating other signals in this path, pass primary RF transmit signals within a fourth operating band between a second one of the first set of input/output nodes 90B and the first common node 88 while attenuating other signals in this path, pass primary RF receive signals within the first operating band between the first common node 88 and a third one of the first set of input/output nodes 90C while attenuating other signals in this path, pass primary RF receive signals within the second operating band, the third operating band, and the fourth operating band between the first common node 88 and a fourth one of the first set of input/output nodes 90D while attenuating other signals in this path, and pass primary RF receive signals within a fifth operating band between the first common node 88 and a fifth one of the first set of input/output nodes 90E while attenuating other signals in this path.

The second sub-filter 96B is a receive filter configured to pass primary RF receive signals within a sixth operating band between the first common node 88 and a sixth one of the first set of input/output nodes 90F while attenuating other signals in this path.

The third sub-filter 96C is a duplexer configured to pass primary RF transmit signals within a seventh operating band between a seventh one of the first set of input/output nodes 90G and the first common node 88 while attenuating other signals in this path and pass primary RF receive signals within the seventh operating band between the first common node 88 and an eighth one of the first set of input/output nodes 90H while attenuating other signals in this path.

The second filter 86B is a heptaplexer configured to pass primary RF transmit signals within the second operating band between the first one of the second set of input/output nodes 94A and the second common node 92 while attenuating other signals in this path, pass primary RF transmit signals within an eighth operating band between a second one of the second set of input/output nodes 94B and the second common node 92 while attenuating other signals in this path, pass primary RF transmit signals within a ninth operating band between a third one of the second set of input/output nodes 94C and the second common node 92 while attenuating other signals in this path, pass primary RF receive signals within the eighth operating band between the second common node 92 and a fourth one of the second set of input/output nodes 94D while attenuating other signals in this path, pass primary RF receive signals within the second operating band between the second common node 92 and a fifth one of the second set of input/output nodes 94E while attenuating other signals in this path, pass primary RF receive signals within the ninth operating band between the second common node 92 and a sixth one of the second set of input/output nodes 94F while attenuating other signals in this path, and pass primary RF receive signals within a tenth operating band between the second common node 92 and a seventh one of the second set of input/output nodes 94G while attenuating other signals in this path.

The primary front end switching circuitry 78 may selectively couple the second sub-filter 96B to the first sub-filter 96A when the RF front end circuitry 62 is receiving in the sixth operating band, connect the third sub-filter 96C to the first sub-filter 96A when the RF front end circuitry 62 is transmitting and/or receiving in the seventh operating band, or may isolate the second sub-filter 96B and the third sub-filter 96C from the first sub-filter 96A when the RF front end circuitry 62 is not transmitting and/or receiving in the sixth operating band or the seventh operating band. Those skilled in the art will appreciate that providing the first filter 86A in this manner may allow the primary RF filtering circuitry 80 to support a desired number of operating bands while reducing loading in the RF signal path of the primary communications circuitry 64. The primary front end switching circuitry 78 may connect the antenna swapping circuitry 76 to one of the first filter 86A (the configuration of which is set by the primary front end switching circuitry 78 as discussed above) and the second filter 86B, depending on the operating bands in which the RF front end circuitry 62 is transmitting and/or receiving.

The first primary RF power amplifier 84A may be configured to amplify RF transmit signals within the first operating band, the second operating band, and the third operating band. Depending on the operating band or operating bands in which the first primary RF power amplifier 84A is transmitting and the operating band or operating bands in which the RF front end circuitry 62 is receiving, a number of primary band switches SW_PB in a first band switch 82A may couple the first primary RF power amplifier 84A to one of the first filter 86A and the second filter 86B.

The second primary RF power amplifier 84B may be configured to amplify RF transmit signals within the fourth operating band and the eighth operating band. Depending on the operating band or operating bands in which the second primary RF power amplifier 84B is transmitting and the operating band or operating bands in which the RF front end circuitry 62 is receiving, a number of primary band switches SW_PB in a second band switch 82B may couple the second primary RF power amplifier 84B to one of the first filter 86A and the second filter 86B.

The third primary RF power amplifier 84C may be configured to amplify RF transmit signals within the seventh operating band. Depending on the operating band or operating bands in which the third primary RF power amplifier 84C is transmitting and the operating band or operating bands in which the RF front end circuitry 62 is receiving, a number of primary band switches SW_PB in a third band switch 82C may couple the third primary RF power amplifier 84C to the first filter 86A. Since the third primary RF power amplifier 84C does not provide RF transit signals in an operating band supported by the second filter 86B, the third band switch 82C does not connect thereto. While not shown, additional switches in the first band switch 82A, the second band switch 82B, and the third band switch 82C may couple the respective primary RF power amplifiers 84 to additional filters in the primary RF filtering circuitry 80.

While not shown, a number of low-noise amplifiers (LNAs) may connect the remaining input/output nodes in the first set of input/output nodes 90 and the second set of input/output nodes 94 in order to amplify receive signals therefrom for further processing. Notably, the RF front end circuitry 62 shown in FIG. 2 is merely exemplary, and does not limit the scope of the present disclosure. Those skilled in the art will appreciate that the configuration of the primary front end switching circuitry 78, the primary RF filtering circuitry 80, the band switches 82, and the primary RF power amplifiers 84 is merely one of many configurations suitable for accomplishing the objectives of the present disclosure, all of which are contemplated herein.

The secondary communications circuitry 66 includes antenna swapping circuitry 98 coupled between the secondary antenna 72 and secondary front end switching circuitry 100 and secondary RF filtering circuitry 102 coupled to the secondary front end switching circuitry 100. The secondary front end switching circuitry 100 includes a number of secondary front end switching elements SW_SFE configured to selectively couple one or more filters in the secondary RF filtering circuitry 102 to the antenna swapping circuitry 98. The secondary RF filtering circuitry 102 includes a first filter 104A, a second filter 104B, and a third filter 104C. The first filter 104A and the second filter 104B form a reconfigurable filter with the third filter 104C as the third filter 104C is selectively coupled to one of the first filter 104A and the second filter 104B by the secondary front end switching circuitry 100. The first filter 104A is coupled between a first common node 106 and a first set of input/output nodes 108. The second filter 104B is coupled between a second common node 110 and a second set of input/output nodes 112. The third filter 104C is coupled between a transmit signal input node 114 and a reconfigurable output node 116.

The first filter 104A is a triplexer configured to pass secondary RF receive signals within the second operating band, the third operating band, and the fourth operating band between the first common node 106 and a first one of the first set of input/output nodes 108A, pass secondary RF receive signals within the eighth operating band between the first common node 106 and a second one of the first set of input/output nodes 108B while attenuating other signals in this path, and pass secondary RF receive signals within the ninth operating band between the first common node 106 and a third one of the first set of input/output nodes 108C while attenuating other signals in this path.

The second filter 104B is also a triplexer configured to pass secondary RF receive signals within the first operating band between the second common node 110 and a first one of the second set of input/output nodes 112A while attenuating other signals in this path, pass secondary RF receive signals within the second operating band and the fourth operating band between the second common node 110 and a second one of the second set of input/output nodes 112B while attenuating other signals in this path, and pass secondary RF receive signals within the seventh operating band between the second common node 110 and a third one of the second set of input/output nodes 112C while attenuating other signals in this path.

While not shown, a number of LNAs may connect to the first set of input/output nodes 108 and the second set of input/output nodes 112 in order to amplify receive signals therefrom for further processing.

The third filter 104C is a transmit filter configured to pass primary RF transmit signals within the first operating band between the transmit signal input node 114 and the reconfigurable output node 116 while attenuating other signals in this path. The secondary front end switching circuitry 100 is configured to selectively couple the reconfigurable output node 116 to one of the first common node 106 and the second common node 110, or isolate the reconfigurable output node 116 from the first common node 106 and the second common node 110. When operating in an uplink carrier aggregation mode where primary RF transmit signals within the first operating band are transmitted, for example, simultaneously with primary RF transmit signals in the fourth operating band, the control circuitry 68 may cause the secondary front end switching circuitry 100 to couple the first common node 106 and the reconfigurable output node 116 such that a quadplexer is formed with the first filter 104A and the third filter 104C. Primary RF transmit signals within the first operating band may be provided by a secondary RF power amplifier 118 with an output coupled to the transmit signal input node 114 of the third filter 104C, where they are passed to the antenna swapping circuitry 98. Accordingly, primary RF transmit signals within the first operating band may be provided by the secondary communications circuitry 66, while primary RF transmit signals in the fourth operating band may be provided by the primary communications circuitry 64. This is a departure from conventional approaches in which the secondary communications circuitry 66 is used only for processing secondary RF receive signals as discussed above, or approaches in which multiple separate primary communications circuitry are provided, each able to generate primary RF transmit signals in one or more desired bands. Instead, a single RF power amplifier configured to amplify primary RF transmit signals within one or more problematic operating bands is added to the secondary communications circuitry 66 and used to transmit primary RF transmit signals when operating in uplink carrier aggregation configurations in which intermodulation is an issue. In different carrier aggregation configurations, the secondary front end switching circuitry 100 may couple the reconfigurable output node 116 to the second common node 110, or may disconnect the reconfigurable output node 116 from both the first common node 106 and the second common node 110. Those skilled in the art will appreciate the operation of the secondary front end switching circuitry 100 in this manner.

As discussed above, the first operating band may be Long Term Evolution (LTE) operating band 3 with a transmit frequency of 1710-1785 MHz and a receive frequency of 1805-1880 MHz, the second operating band may be LTE operating band 4 with a transmit frequency of 1710-1755 MHz and a receive frequency of 2110-2155 MHz, the third operating band may be LTE operating band 66 with a transmit frequency of 1710-1780 MHz and a receive frequency of 2110-2200 MHz, the fourth operating band may be LTE operating band 1 with a transmit frequency of 1920-1980 MHz and a receive frequency of 2110-2170 MHz, the fifth operating band may be LTE operating band 40 (TDD) with a receive frequency of 2300-2400 MHz, the sixth operating band may be LTE operating band 41 (TDD) with a receive frequency of 2496-2690 MHz, the seventh operating band may be LTE operating band 7 with a transmit frequency of 2500-2570 MHz and a receive frequency of 2620-2690 MHz, the eighth operating band may be LTE band 25 with a transmit frequency of 1850-1915 MHz and a receive frequency of 1930-1995 MHz, the ninth operating band may be LTE operating band 30 with a transmit frequency of 2305-2315 MHz and a receive frequency of 2350-2360 MHz, and the tenth operating band may be LTE operating band 38 (TDD) with a receive frequency of 2570-2620 MHz.

Certain combinations of operating bands may be problematic for uplink carrier configurations. For example, simultaneous transmission of primary RF transmit signals within the first operating band and the fourth operating band may cause problems due to intermodulation products of the signals falling within a receive band. Additional combinations of bands that are problematic include the second operating band and the eighth operating band, as well as the third operating band and the eighth operating band. Providing the secondary RF power amplifier 118 and operating it to provide primary RF transmit signals in uplink carrier aggregation configurations having problematic operating band combinations (e.g., the first operating band and the fourth operating band) provides antenna-to-antenna isolation between the primary RF transmit signals such that the level of leakage in the respective signal paths thereof is significantly reduced, resulting in less intermodulation. Accordingly, the problems discussed above with respect to conventional RF front end circuitry may be reduced or eliminated by adding only a single secondary RF power amplifier 118 and a few secondary front end switching elements SW_SFE to the secondary communications circuitry 66, which does not affect operation of the RF front end circuitry 62 during non-uplink carrier aggregation modes.

In general, the control circuitry 68 may operate the various components of the primary communications circuitry 64 and the secondary communications circuitry 66 such that in one or more problematic uplink carrier aggregation configurations in which intermodulation is an issue, RF transmit signals within a first problematic operating band are provided from the secondary communications circuitry 66, while RF transmit signals within a second problematic operating band are provided from the primary communications circuitry 64. As discussed above, this provides a significant increase in isolation of the signals, thereby reducing intermodulation and the problems associated therewith. When not in an uplink carrier aggregation mode of operation, the control circuitry 68 may operate the RF front end circuitry 62 such that all of the RF transmit signals are provided from the primary communications circuitry 64 as usual. Accordingly, the first primary RF power amplifier 84A is configured to amplify primary RF transmit signals within the first operating band, and the secondary RF power amplifier 118 is configured to amplify primary RF transmit signals within the first operating band. The control circuitry 68 causes the secondary RF power amplifier 118 to provide the primary RF transmit signals in the first operating band in one or more troublesome uplink carrier aggregation configurations as discussed above, and causes the first primary RF power amplifier 84A to provide the primary RF transmit signals in the first operating band in non-uplink carrier aggregation configurations and/or uplink carrier aggregation configurations in which intermodulation is less of an issue.

Notably, the RF front end circuitry 62 described above may be used along with any combination of operating bands without departing from the principles of the present disclosure. Those skilled in the art will appreciate that the aforementioned operating bands are merely exemplary, and that RF filtering circuitry appropriate for supporting any number of different operating bands may be provided in the RF front end circuitry 62.

While only one secondary RF power amplifier 118 is shown in the secondary communications circuitry 66, any number of secondary RF power amplifiers 118 may be provided to compensate for other combinations of operating bands that may be problematic in carrier uplink configurations. Further, the secondary RF power amplifier 118 may be a multiband RF power amplifier capable of amplifying primary RF transmit signals in multiple operating bands. In some embodiments, the secondary RF power amplifier 118 may be a micro RF power amplifier. As discussed herein, a micro RF power amplifier is an RF power amplifier with a reduced output power when compared to a normal RF power amplifier. Due to limits on the overall transmit power of wireless communications circuitry imposed by standards and the fact that the secondary RF power amplifier 118 is only used during uplink carrier aggregation, the maximum output power achievable by the secondary RF power amplifier 118 may be reduced, and therefore it may be advantageous to provide a micro RF power amplifier that consumes less power and space in the RF front end circuitry 62.

The antenna swapping circuitry 76 in the primary communications circuitry 64 and the antenna swapping circuitry 98 in the secondary communications circuitry 66 are coupled via the first antenna swapping line 74A and the second antenna swapping line 74B. In some embodiments, the first antenna swapping line 74A and the second antenna swapping line 74B may be coaxial lines due to the fact that they may span a relatively long distance. The antenna swapping circuitry 76 in the primary communications circuitry 64 may cooperate with the antenna swapping circuitry 98 in the secondary communications circuitry 66 to selectively couple one of the primary antenna 70 and the secondary antenna 72 to the primary front end switching circuitry 78 and couple the antenna not coupled to the primary front end switching circuitry 78 to the secondary front end switching circuitry 100.

Figure 3:
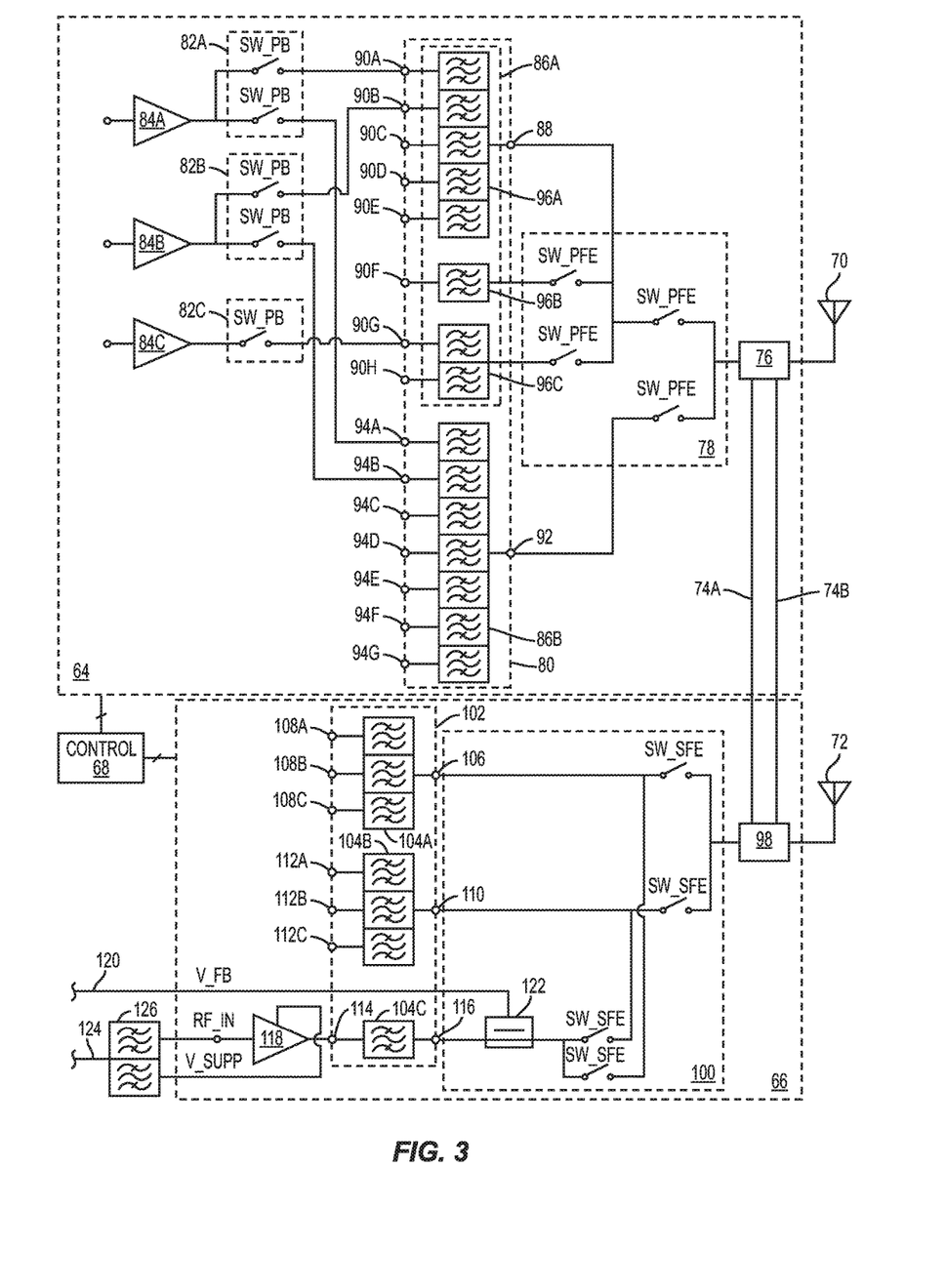
FIG. 3 is a functional schematic of RF front end circuitry according to one embodiment of the present disclosure.

While not shown in FIG. 2, the RF power amplifiers must be provided a supply voltage V_SUPP and an RF input signal RF_IN, and generally must provide a feedback signal V_FB indicative of a transmit power of an RF transmit signal provided therefrom for transmit power control. Accordingly, FIG. 3 shows the RF front end circuitry 62 with connections provided to the secondary RF power amplifier 118. As will be appreciated by those skilled in the art, the secondary communications circuitry 66 is often placed near the secondary antenna 72, which is often at an opposite side of a wireless communications device than the primary communications circuitry 64 and the primary antenna 70. Transceiver circuitry (i.e., baseband conversion and processing circuitry) are generally located near the primary communications circuitry 64 to avoid losses in primary RF transmit signals and primary RF receive signals communicated to and from the primary communications circuitry 64. Accordingly, signals communicated to and from the secondary communications circuitry 66 generally must travel a relatively long distance to reach transceiver circuitry in a wireless communications device. The signals to and from the secondary communications circuitry 66 are thus generally provided via shielded lines such as coaxial lines in order to reduce noise and ensure robustness. Accordingly, FIG. 3 shows a feedback line 120, which may be a coaxial line, which provides a feedback signal V_FB from a coupler 122 to desired circuitry such as dedicated transmit power control circuitry or transceiver circuitry. The end location of the feedback signal V_FB is not relevant to the present disclosure and thus only a section of the feedback line 120 is shown. Further, an input line 124 is provided to a diplexer 126 to provide a supply voltage V_SUPP and an RF input signal RF_IN to the secondary RF power amplifier 118. The supply voltage V_SUPP and the RF input signal RF_IN may be provided together on the input line 124 and separated by the diplexer 126 in order to minimize the number of lines required.

Figure 4:
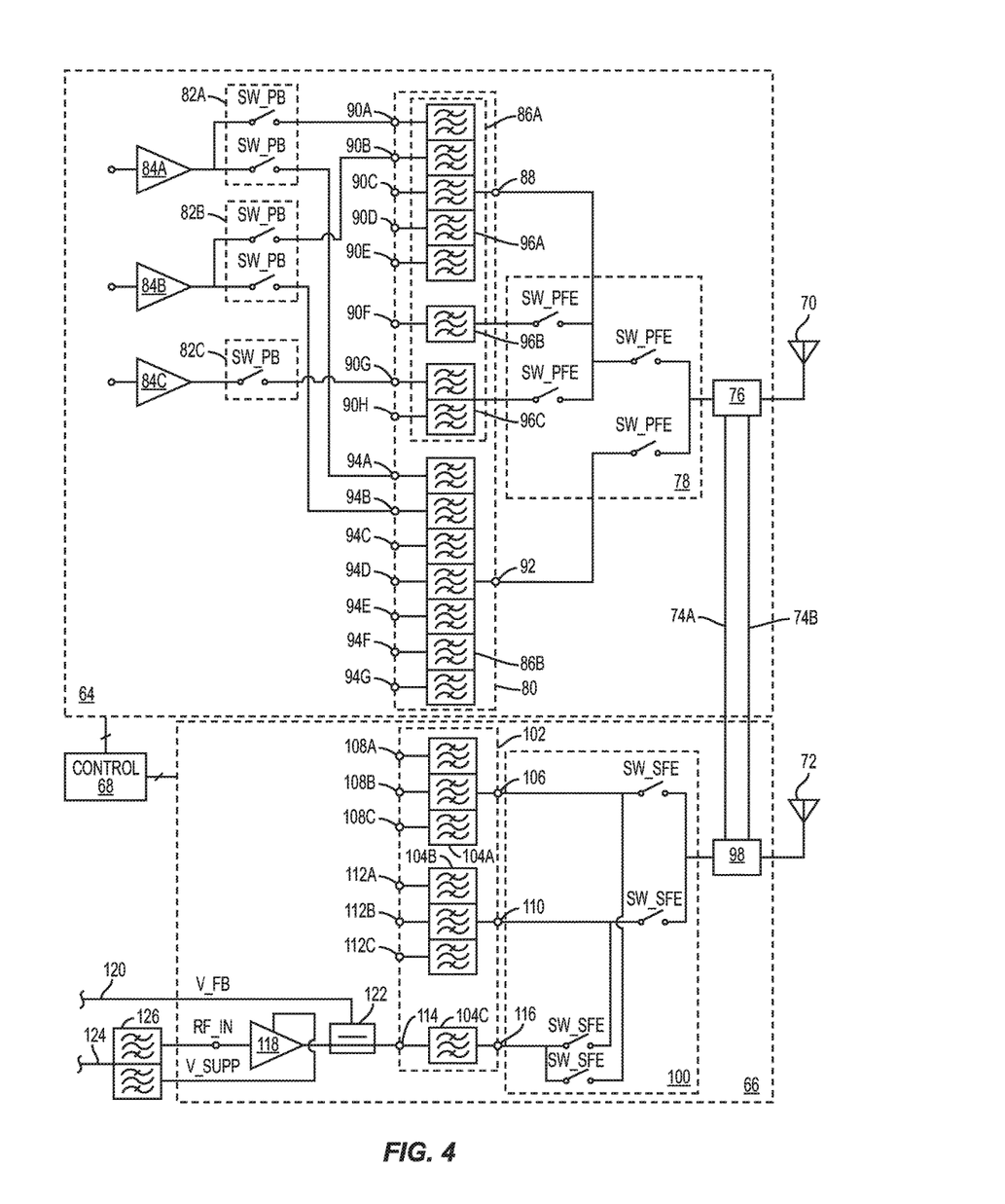
FIG. 4 is a functional schematic of RF front end circuitry according to one embodiment of the present disclosure.

In some embodiments, the coupler 122 may be provided between the secondary RF power amplifier 118 and the third filter 104C rather than between the third filter 104C and the secondary front end switching circuitry 100, as shown in FIG. 4. This may be advantageous, as the third filter 104C may filter leakage signals from antenna-to-antenna coupling and the antenna swapping lines 74 to provide a more accurate representation of the transmit power of the secondary RF power amplifier 118.

Figure 5:
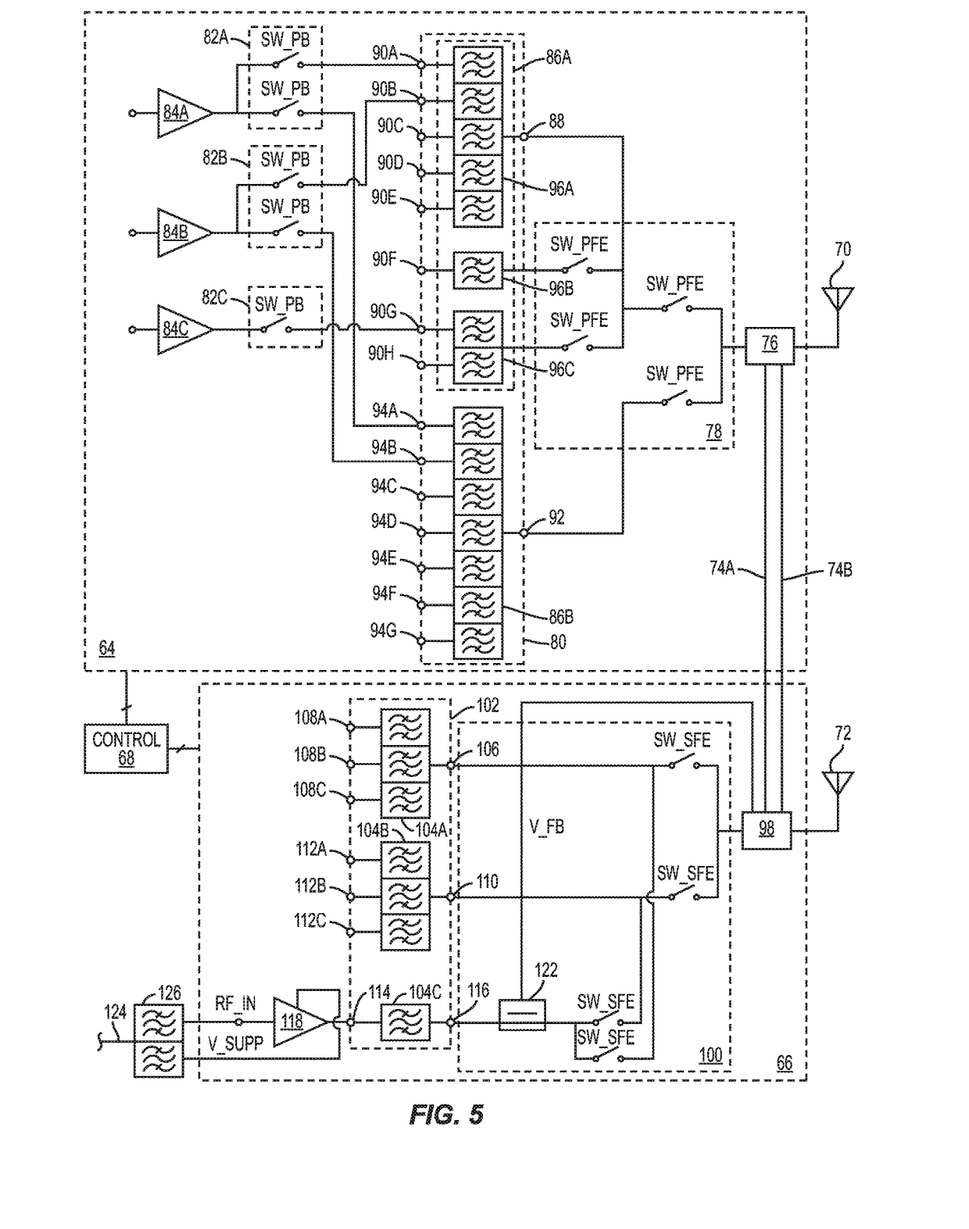
FIG. 5 is a functional schematic of RF front end circuitry according to one embodiment of the present disclosure.
Figure 6:
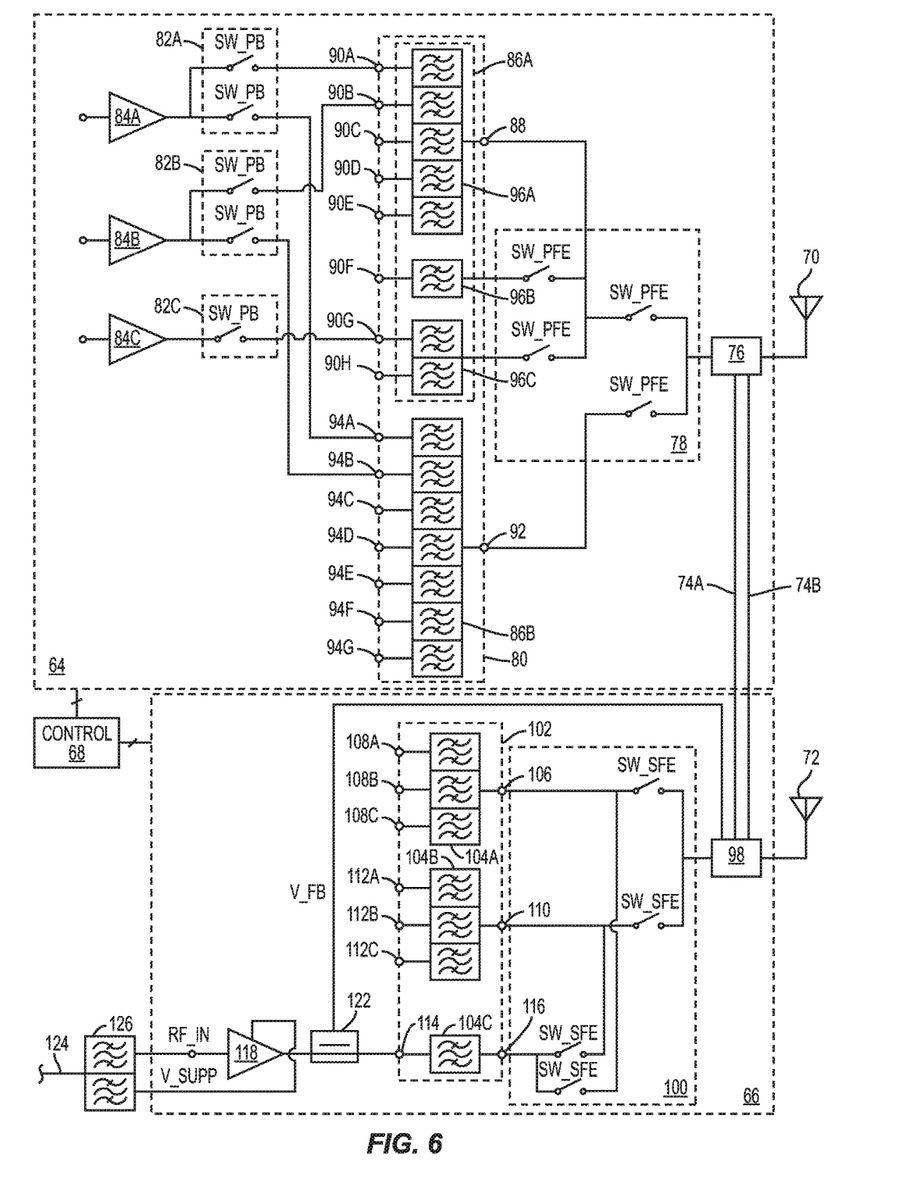
FIG. 6 is a functional schematic of RF front end circuitry according to one embodiment of the present disclosure.

In some embodiments, the feedback signal V_FB from the coupler 122 may be communicated by one of the antenna swapping lines 74, thus allowing for the removal of the feedback line 120, as shown in FIG. 5. Details of using antenna swapping circuitry and antenna swapping lines 74 to transport feedback signals is discussed in coassigned and copending U.S. patent application Ser. No. 15/083,791, now U.S. Pat. No. 9,654,151, the contents of which are hereby incorporated by reference in their entirety. In such an embodiment, the feedback signal V_FB is provided to the antenna swapping circuitry 98 in the secondary communications circuitry 66, where it is routed to the antenna swapping circuitry 76 in the primary communications circuitry 64 and provided to the necessary transmit power control circuitry and/or transceiver circuitry. When the antenna swapping lines 74 are used to swap the primary antenna 70 and the secondary antenna 72, they may not be used to transport the feedback signal V_FB. As discussed above, the coupler 122 may be provided between the secondary RF power amplifier 118 and the third filter 104C, rather than between the third filter 104C and the secondary front end switching circuitry 100. FIG. 6 shows such an embodiment wherein the feedback signal V_FB is provided from one of the antenna swapping lines 74 as discussed above.

Those skilled in the art will recognize improvements and modifications to the preferred embodiments of the present disclosure. All such improvements and modifications are considered within the scope of the concepts disclosed herein and the claims that follow.

What is claimed is:

1. Radio frequency (RF) front end circuitry comprising:
   primary communications circuitry coupled to a primary antenna node and configured to:

receive and process primary RF receive signals within a first operating band and primary RF receive signals within a second operating band from the primary antenna node; and provide primary RF transmit signals within the second operating band to the primary antenna node;

secondary communications circuitry coupled to a secondary antenna node and configured to:

receive and process secondary RF receive signals within the first operating band and secondary RF receive signals within the second operating band from the secondary antenna node; and provide primary RF transmit signals within the first operating band to the secondary antenna node; and antenna swapping circuitry coupled to the primary antenna node and the secondary antenna node and configured to selectively couple the primary antenna node to one of a primary antenna and a secondary antenna and couple the secondary antenna node to a different one of the primary antenna and the secondary antenna.

2. The RF front end circuitry of claim 1 further comprising control circuitry coupled to the primary communications circuitry and the secondary communications circuitry and configured to cause the RF front end circuitry to simultaneously provide the primary RF transmit signals within the first operating band from the secondary communications circuitry to the secondary antenna node and provide the primary RF transmit signals within the second operating band from the primary communications circuitry to the primary antenna node in an inter-band uplink carrier aggregation mode of operation.

3. The RF front end circuitry of claim 2 wherein:
the primary communications circuitry is further configured to provide the primary RF transmit signals within the first operating band to the primary antenna node in a non-uplink carrier aggregation mode of operation; and the control circuitry is further configured to cause the RF front end circuitry to provide one of the primary RF transmit signals within the first operating band and the primary RF transmit signals within the second operating band from the primary communications circuitry to the primary antenna node in the non-uplink carrier aggregation mode of operation.

4. The RF front end circuitry of claim 3 wherein:
the primary communications circuitry comprises:
a first primary RF power amplifier configured to amplify the primary RF transmit signals within the first operating band; and
a second primary RF power amplifier configured to amplify the primary RF transmit signals within the second operating band; and
the secondary communications circuitry comprises:
a secondary RF power amplifier configured to amplify the primary RF transmit signals within the first operating band.

5. The RF front end circuitry of claim 4 wherein:
the primary communications circuitry further comprises primary RF filtering circuitry configured to:
pass the primary RF transmit signals within the first operating band between the first primary RF power amplifier and the primary antenna node while attenuating other signals;
pass the primary RF transmit signals within the second operating band between the second primary RF power amplifier and the primary antenna node while attenuating other signals; and
separately deliver the primary RF receive signals within the first operating band and the primary RF receive signals within the second operating band to different primary receive signal paths; and
the secondary communications circuitry further comprises secondary RF filtering circuitry configured to:
pass the primary RF transmit signals within the first operating band between the secondary RF power amplifier and the secondary antenna node while attenuating other signals; and
separately deliver the secondary RF receive signals within the first operating band and the secondary RF receive signals within the second operating band to different secondary receive signal paths.

6. The RF front end circuitry of claim 5 wherein the primary RF filtering circuitry comprises a reconfigurable multiplexer.

7. The RF front end circuitry of claim 6 wherein the secondary RF filtering circuitry comprises a reconfigurable multiplexer.

8. The RF front end circuitry of claim 5 further comprising the antenna swapping circuitry coupled to the primary antenna node and the secondary antenna node and configured to selectively couple the primary antenna node to one of the primary antenna and the secondary antenna and couple the secondary antenna node to a different one of the primary antenna and the secondary antenna.

9. The RF front end circuitry of claim 5 wherein:
the first operating band is one of Long Term Evolution (LTE) operating band 1, LTE operating band 4, and LTE operating band 66; and
the second operating band is one of LTE operating band 3 and LTE operating band 25.

10. The RF front end circuitry of claim 1 wherein:
the primary communications circuitry comprises a first primary RF power amplifier configured to amplify the primary RF transmit signals within the first operating band; and
the secondary communications circuitry comprises a secondary RF power amplifier configured to amplify the primary RF transmit signals within the first operating band.

11. The RF front end circuitry of claim 10 wherein:
the primary communications circuitry further comprises primary RF filtering circuitry configured to:
pass the primary RF transmit signals within the first operating band between the first primary RF power amplifier and the primary antenna node while attenuating other signals; and
separately deliver the primary RF receive signals within the first operating band and the primary RF receive signals within the second operating band to different primary receive signal paths; and
the secondary communications circuitry further comprises secondary RF filtering circuitry configured to:
pass the primary RF transmit signals within the first operating band between the secondary RF power amplifier and the secondary antenna node while attenuating other signals; and
separately deliver the secondary RF receive signals within the first operating band and the secondary RF receive signals within the second operating band to different secondary receive signal paths.

12. The RF front end circuitry of claim 11 wherein the primary RF filtering circuitry comprises a reconfigurable multiplexer.

13. The RF front end circuitry of claim 12 wherein the secondary RF filtering circuitry comprises a reconfigurable multiplexer.

14. The RF front end circuitry of claim 1 wherein:
the first operating band is one of Long Term Evolution (LTE) operating band 1, LTE operating band 4, and LTE operating band 66; and
the second operating band is one of LTE operating band 3 and LTE operating band 25.

15. Radio frequency (RF) front end circuitry comprising:
a primary antenna node and a secondary antenna node;
primary communications circuitry coupled to the primary antenna node and configured to:
    receive and process primary RF receive signals within a first operating band and primary RF receive signals within a second operating band from the primary antenna node; and
    provide primary RF transmit signals within the second operating band to the primary antenna node;
secondary communications circuitry coupled to the secondary antenna node and configured to:
    receive and process secondary RF receive signals within the first operating band and secondary RF receive signals within the second operating band from the secondary antenna node; and
    provide primary RF transmit signals within the first operating band to the secondary antenna node;
antenna swapping circuitry coupled to the primary antenna node and the secondary antenna node and configured to selectively couple the primary antenna node to one of a primary antenna and a secondary antenna and couple the secondary antenna node to a different one of the primary antenna and the secondary antenna; and
control circuitry coupled to the primary communications circuitry, the secondary communications circuitry, and the antenna swapping circuitry, the control circuitry configured to cause the RF front end circuitry to simultaneously provide the primary RF transmit signals within the first operating band from the secondary communications circuitry to the secondary antenna node and provide the primary RF transmit signals within the second operating band from the primary communications circuitry to the primary antenna node in an uplink carrier aggregation mode of operation.

16. The RF front end circuitry of claim 15 wherein:
the primary communications circuitry is further configured to provide the primary RF transmit signals within the first operating band to the primary antenna node in a non-uplink carrier aggregation mode of operation; and
the control circuitry is further configured to cause the RF front end circuitry to provide one of the primary RF transmit signals within the first operating band and the primary RF transmit signals within the second operating band from the primary communications circuitry to the primary antenna node in the non-uplink carrier aggregation mode of operation.

17. The RF front end circuitry of claim 16 wherein:
the primary communications circuitry comprises:
    a first primary RF power amplifier configured to amplify the primary RF transmit signals within the first operating band; and
    a second primary RF power amplifier configured to amplify the primary RF transmit signals within the second operating band; and
the secondary communications circuitry comprises:
    a secondary RF power amplifier configured to amplify the primary RF transmit signals within the first operating band.

18. The RF front end circuitry of claim 17 wherein:
the primary communications circuitry further comprises primary RF filtering circuitry configured to:
    pass the primary RF transmit signals within the first operating band between the first primary RF power amplifier and the primary antenna node while attenuating other signals;
    pass the primary RF transmit signals within the second operating band between the second primary RF power amplifier and the primary antenna node while attenuating other signals; and
    separately deliver the primary RF receive signals within the first operating band and the primary RF receive signals within the second operating band to different primary receive signal paths; and
the secondary communications circuitry further comprises secondary RF filtering circuitry configured to:
    pass the primary RF transmit signals within the first operating band between the secondary RF power amplifier and the secondary antenna node while attenuating other signals; and
    separately deliver the secondary RF receive signals within the first operating band and the secondary RF receive signals within the second operating band to different secondary receive signal paths.

19. The RF front end circuitry of claim 18 further comprising the antenna swapping circuitry coupled to the primary antenna node and the secondary antenna node and configured to selectively couple the primary antenna node to one of the primary antenna and the secondary antenna and couple the secondary antenna node to a different one of the primary antenna and the secondary antenna.

20. The RF front end circuitry of claim 18 wherein:
the first operating band is one of Long Term Evolution (LTE) operating band 1, LTE operating band 4, and LTE operating band 66; and
the second operating band is one of LTE operating band 3 and LTE operating band 25.

* * * * *